June 28, 1960 R. C. SAMPSON 2,942,843
BLADE VIBRATION DAMPING STRUCTURE
Filed June 15, 1956
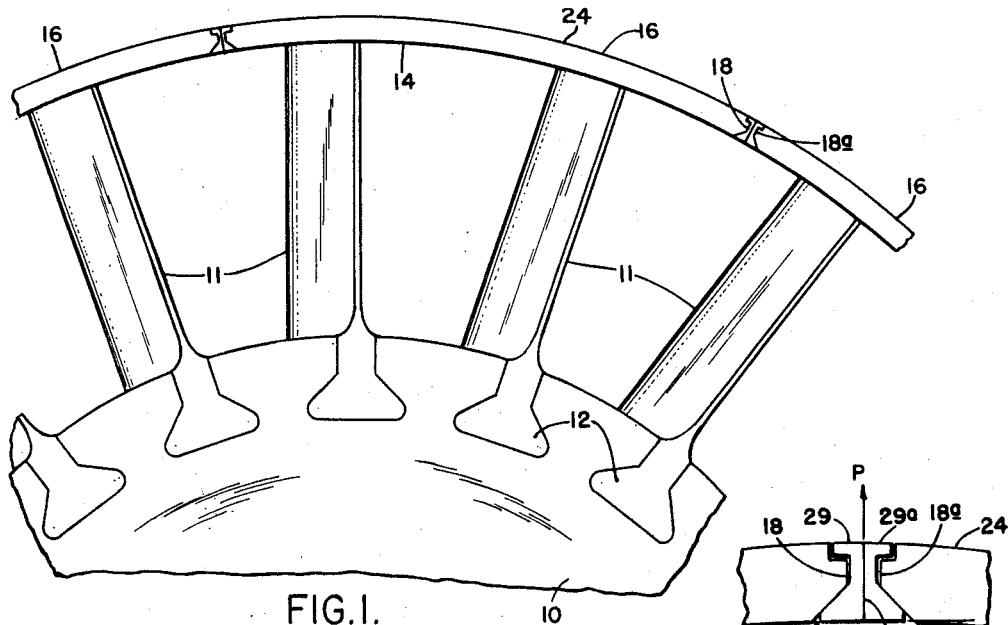
FIG.1.
FIG.2.
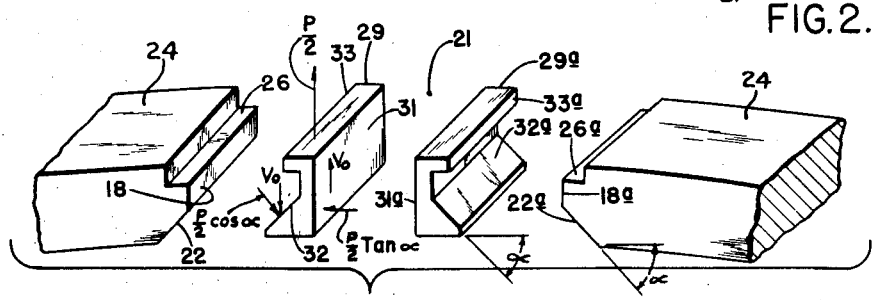
FIG.3.
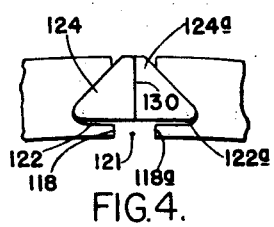
FIG.4.
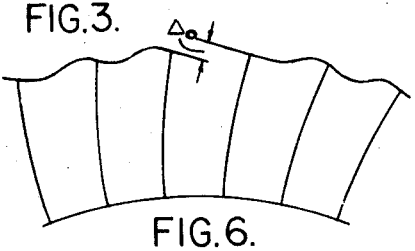
FIG.6.
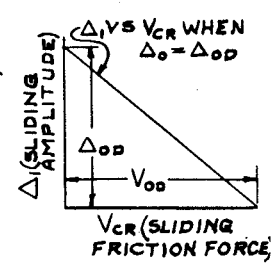
FIG.8.
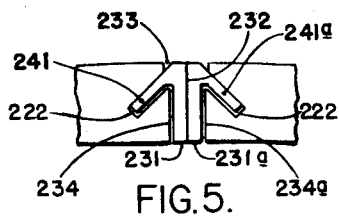
FIG.5.
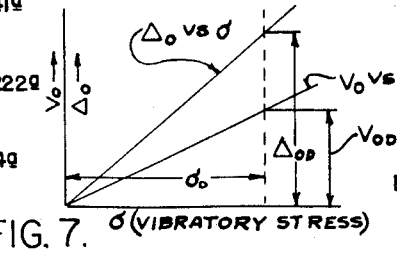
FIG.7. σ (VIBRATORY STRESS)
INVENTOR
Robert C. Sampson
BY
ATTORNEY

United States Patent Office 2,942,843
Patented June 28, 1960

2,942,843

BLADE VIBRATION DAMPING STRUCTURE

Robert C. Sampson, Pittsburgh, Pa., assignor to Westinghouse Electric Corporation, East Pittsburgh, Pa., a corporation of Pennsylvania Filed June 15, 1956, Ser. No. 591,663

3 Claims. (Cl. 253—77)

This invention relates to blade vibration dampers for axial-flow elastic fluid apparatus, such as axial-flow compressors and turbines, of the type wherein friction between relatively moving surfaces serves to dampen the blade vibrations.

An object of this invention is to provide a friction damper which upon wear will be self-compensating.

A further object is to provide a friction damper, the wear of which will not affect blade strength.

Another object of this invention is to provide a friction damper which is of simple construction and which lends itself conveniently to mathematical analysis.

A further object is to obtain maximum damping effect by locating the damper where the amplitude of vibration is the greatest.

One embodiment of the present invention provides, in a blade row, an opening between shrouds in which is inserted a damping means. The damping means is divided into two halves along a radial line, each half having an inclined surface which engages a similar oblique surface on the adjacent shroud so that the centrifugal force maintains the two halves in frictional contact along the dividing radial line, thus providing friction damping of blade vibrations.

These and other objects are effected by the invention as will be apparent from the following description and claims taken in connection with the accompanying drawings, forming a part of this application, in which:

Fig. 1 is a fragmentary end view of several blades mounted on a rotor disc incorporating the improved damper of this invention;

Fig. 2 is an enlarged detail view of the damper embodied in Fig. 1;

Fig. 3 is an exploded view of the damper shown in Fig. 2;

Figs. 4 and 5 are enlarged detail views, similar to Fig. 2, showing modifications;

Fig. 6 is a schematic view of several blades mounted on a rotor disc not incorporating the damper of this invention showing relative movement between adjacent shrouds;

Fig. 7 is a graph showing the characteristics of a blade group needed for prediction of damper effectiveness; and Fig. 8 is a graph showing the assumed linear relationship between sliding motion amplitude and sliding friction force.

Referring to the drawing, and in particular to Fig. 1, a typical turbine rotor disc 10 is illustrated carrying a plurality of blades 11, of conventional form, which constitutes one stage of an axial-flow turbine.

The blades are attached to the rotor by means of root portions 12. In addition, each blade is secured to an annular shroud 14, which is divided into a plurality of segments 16 defining a plurality of blade groups. As is well known in the art, and illustrated in Fig. 1, a plurality of blades may be secured to one shroud segment 16. The shroud segments have end portions having end faces 18 and 18a extending radially, the specific configuration of which will be hereinafter described.

Referring to Figs. 2 and 3, it is seen that the end faces or surfaces of adjacent segments are spaced apart to provide an opening, as at 21. A friction damping device to be subsequently described in detail is inserted between the shroud segments in this opening. Each end face of the shroud segment is formed with oblique surfaces 22 and 22a. The oblique surfaces 22 and 22a extend transversely of the blade row, and are arranged so as to converge outwardly and intersect the end faces 18 and 18a, respectively, at approximately the middle of each shroud thickness. At the portion of each end face nearest the outer circumference 24 of the shroud there are formed transverse grooves or shoulders 26 and 26a.

The friction damper is formed in two halves, 29 and 29a, respectively, which are of identical shape. Each half is formed with a radial flat back portion 31 or 31a extending transversely of the blade row. In addition, each half is formed on the side adjacent the shroud end face with a transverse inclined surface 32 or 32a at the same angle as the oblique surface 22 or 22a of the shroud end faces, so that when the two halves are placed back to back, the inclined surfaces converge outwardly. The inclined surface 32 or 32a and the oblique surface 22 or 22a are at an angle to a line drawn normal to the radial flat back portion 31 or 31a. The portion of each damper half farthest removed from the inclined surfaces 32 or 32a, but adjacent to the end faces, is formed with a rectangular protrusion 33 or 33a which is intended to engage the transverse groove 26 or 26a of the shroud. The two halves are placed back to back in the space between shroud segments, as shown in Figs. 2 and 3, so as to be symmetrical about a radial line.

When the blades are rotating, the centrifugal force exerts an outward pull on the dampers and contact occurs between the oblique surfaces 22 and 22a and the inclined surfaces 32 and 32a, and because of the resulting wedging effect, contact occurs between the two damper backs 31 and 31a, along a radial line 30.

When the blades are at a standstill, the dampers at the top of the blade row, of a turbine on a horizontal axis, tend to drop out due to gravity. This is prevented by the rectangular protrusions 33 and 33a and the mating grooves 26 and 26a.

When two adjoining blade groups begin to vibrate in phase, one shroud end tends to deflect radially outward and the other inward, as shown schematically in Fig. 6. Where the damping device of this invention is employed, friction between the damper halves at first prevents such relative motion, but when the vibration amplitude becomes great enough, the vibratory force exerted by the shroud end on the damper half is sufficient to break the friction contact between damper halves. Sliding between damper halves then occurs, and energy is dissipated. In order to increase the amount of energy dissipated, they may be made of dissimilar material.

The steady forces upon the damper, due to rotation at constant speed, are indicated in Figs. 2 and 3. Centrifugal force P holds the damper halves in place against the shroud segments. The force which is normal to one radial surface, i.e., 31, is $$\frac{P \tan \alpha}{2}$$

The pressure upon one inclined surface, i.e., 32, is $$\frac{P}{2 \cos \alpha}$$

Since $P/2$ multiplied by $\tan \alpha$ is less than $P/2$ divided by $\cos \alpha$, the result is that the force on a radial back, i.e., 31 is less than that on an inclined surface, i.e., 32. Therefore, the contact surface between halves has lower friction capacity and will start to slide before the inclined surface. This insures that the damping will take place by reason of one half of the damper sliding on the other half along the radial backs. Thus, the wear which will result is limited to the damper unit and the blades and shrouds are not affected.

The device is self-compensating for wear because as the radial surface 31 or 31a becomes worn, the action of centrifugal force in cooperation with the oblique surface 22 or 22a and the inclined surface 32 or 32a tends to push each half towards the other half so as to insure damping.

If wear is excessive and replacement is required, only the inexpensive damper unit need be replaced.

When the turbine is rotating and the blade groups begin to vibrate with slowly increasing amplitude, the damping device at first provides constraint between groups, as previously stated, and no relative motion between shroud end faces is permitted. The shroud, therefore, exerts an oscillatory force, $V_0$, on the radial line of contact of each damper half. The forces on one damper half are shown by Fig. 3 of the drawing. The oscillatory force is sustained entirely by friction force on the radial surface of the damper half. The two halves will not slide relative to one another until some critical value of oscillatory force $V_{cr}$ is exerted that is sufficient to overcome the friction capacity of the contact surface:

$$V_{cr} = \frac{\mu P \tan \alpha}{2} \quad (1)$$

(or)

$$V_{cr} = \frac{\mu r W w^2 \tan \alpha}{g}$$

where:

$V_{cr}$ = critical value of oscillatory force required to overcome friction capacity of contact surface, pounds.
$\mu$ = sliding friction coefficient of radial flat back contact surfaces.
$P$ = centrifugal force, pounds
$\alpha$ = angle between inclined or oblique surface and a line drawn normal to the radial flat back.
$r$ = radial location of damper with respect to axis of rotation, in.
$W$ = weight of damper half, pounds
$w$ = angular velocity, radians/sec.
$g$ = acceleration of gravity, in./sec.$^2$ When vibration amplitude has become large enough to produce an oscillatory force greater than $V_{cr}$ on the damper halves, sliding motion is produced, and with further buildup of vibration amplitude the peak force remains constant at the value given by Equation 1. This force restrains motion of the shroud ends to some extent, so that instead of the free motion, $\Delta_0$, Fig. 6, a smaller sliding motion, $\Delta_1$, is experienced. The energy absorbed during one cycle of vibration after sliding motion has been established, E, is:

$$E = 2V_{cr}\Delta_1$$

(or)

$$E = \frac{2\mu r W w^2 \Delta_1}{g} \tan \alpha \quad (2)$$

Equation 2 seems to indicate that the greatest energy dissipation will be produced by a damper of large weight and high friction coefficient. This is not necessarily so however, because: (1) a heavy damper with high friction prevents any sliding motion whatever until a correspondingly large vibration amplitude has been established and; (2) large friction forces provide greater restraint on the shroud ends, so that the relative motion, $\Delta_1$, is correspondingly small. It is necesary, in order to attain desired damping, to establish by experiment or analysis the relationship between vibratory stress amplitude $\sigma$, in the blade and the force, $V_0$, required to prevent relative motion of the shroud ends. It is also necessary to establish the relationship between vibratory stress amplitude $\sigma$ and the relative motion of the shroud ends when there is no restraint there, $\Delta_0$. The two required realtionships are indicated schematically in Fig. 7. In Fig. 7, a design value of stress, $\sigma_D$, is indicated. This is the bending vibration stress that can be tolerated but which should not be exceeded. The damper should therefore provide maximum damping when the maximum vibratory bending stress has the value $\sigma_D$. As indicated in Fig. 7, design values of the relative motion of the unrestrained shroud ends, $\Delta_{OD}$, and the force required to completely restrain relative motion of the shroud ends, $V_{OD}$, are determined from the curves.

The actual relative motion between shroud ends, $\Delta_1$, when partially restrained by the friction between damper halves, can be varied between the values zero and $\Delta_{OD}$ simply by varying the characteristics of the damper. Corresponding to those motions are values of friction force between damper halves of $V_{OD}$ and zero respectively. Between those extremes, it is assumed that the variation of $\Delta_1$ with $V_{cr}$ is linear, as in Fig. 8. It is seen from Equation 1 that $V_{cr}$ can be varied at will between the two extremes. But, by Equation 2, no dissipation of energy will occur at either extreme. Therefore, some intermediate value of $V_{cr}$, Fig. 8, is desired. The relationship between $\Delta_1$ and $V_{cr}$, according to Fig. 8, is:

$$\Delta_1 = \Delta_{OD}\left(1 - \frac{V_{cr}}{V_{OD}}\right) \quad (3)$$

The energy dissipated by the damper is, by Equation 2:

$$E = 2\Delta_{OD}V_{cr}\left(1 - \frac{V_{cr}}{V_{OD}}\right) \quad (4)$$

Differentiating Equation 4 with respect to $V_{cr}$ and equating to zero, the required value of $V_{cr}$ for maximum energy dissipation is found to be:

$$(V_{cr})_{max. \, damping} = \frac{V_{OD}}{2} \quad (5)$$

Thus, the design criterion for most effective damping is, by substitution of Equation 5 in Equation 1:

$$V_{OD} = \mu P \tan \alpha$$

(or)

$$\tan \alpha = \frac{V_{OD}}{\mu P}$$

where $V_{OD}$ must be determined from experimental or analytical curves such as those indicated schematically in Fig. 7.

Referring to Fig. 4, a further embodiment of this invention is illustrated. In this embodiment, end faces 118 and 118a of adjacent shrouds are spaced apart, as at 121. The end faces are formed with a plurality of transverse groves 122 and 122a of substantially triangular shape including oblique surfaces for receiving a damping means comprising two halves 124 and 124a each of substantially triangular cross-section and having inclined surfaces mating with the grooves in the end faces of the shrouds and assembled as a triangle whose side faces converge radially outwardly. The triangular halves 124 and 124a are assembled in the mating grooves 122 and 122a so that they are in contact along a radial line 130. In this embodiment also, the angle between a line drawn normal to the radial line 130 and the oblique surfaces may conform to the foregoing equation, for most effective damping. The configuration of the unit is such that when not rotating, the damper will not be displaced beyond that amount of freedom which it is desirable to incorporate in the unit. When the unit is operating, the manner of operation and method of damping is the same as for the first embodiment.

Referring to Fig. 5, another embodiment is shown. In this embodiment, a plurality of radial members 231 and 231a are placed so as to be in contact along a radial line 232. The radial members are placed transversely of the blade row in an opening 233 provided between the end faces 234 and 234a. The end faces 234 and 234a are provided with substantially rectangular grooves 222 and 222a, at an oblique angle to a radial line, extending transversely of the blade row and in communication with the opening 233 between shrouds. Each half of the damping means 231 and 231a is provided with an integral and oblique projection 241 and 241a extending on the side thereof toward the adjacent end face and mating with grooves 222 and 222a. Hence, the oblique projections are at the same angle to a radial line as the grooves in the end faces. In addition, for maximum damping the angle may conform to the foregoing equation. In this embodiment the configuration is such that the damping means will not be displaced when the unit is at rest beyond that amount of freedom which it is desirable to incorporate in the unit. On the other hand, when the unit is rotating, the manner of operation and method of damping is the same as for the first embodiment.

While the invention has been shown in several forms, it will be obvious to those skilled in the art that it is not so limited, but is susceptible of various other changes and modifications without departing from the spirit thereof.

What is claimed is:

1. In elastic-fluid utilizing apparatus, a rotor member rotatable about a central axis, an annular row of blades mounted thereon, arcuate shroud segments attached to said blades, said shroud segments having adjacent end faces spaced apart and defining openings therebetween, said end faces having oblique surface portions, damping means in each of said openings, said damping means being divided into two halves along a plane extending radially from said axis, each said half being provided with an inclined surface adjacent one of the shroud segments, the inclined surfaces of said two halves being convergent in radially outwardly direction, said inclined surface of each damper half mating with one of said oblique surface portions, each half of the damper being subject to the action of centrifugal force and slidably engaging the other half along the radial plane to frictionally resist the blade vibrations during rotation of said rotor member.

2. In elastic-fluid utilizing apparatus, a rotor member rotatable about a central axis, an annular row of blades mounted thereon, arcuate shroud segments attached to said blades, said shroud segments having adjacent end faces spaced apart and defining openings therebetween, said end faces having oblique surface portions, damping means in each of said openings, said damping means being divided into two halves along a plane extending radially from said axis, each said half being provided with an inclined surface, the inclined surfaces of said two halves being convergent in radially outwardly direction, said inclined surface of each damper half mating with one of the oblique surface portions formed on said shroud segment end faces, each half of the damper being subject to the action of centrifugal force and slidably engaging the other half along the radial plane to frictionally resist the blade vibrations during rotation of said rotor member, a protrusion disposed adjacent the radially outer end portion of each damper half, said protrusion extending into overlapping engagement with the adjacent shroud segment, and each shroud segment being provided with a mating groove having said protrusion received therein.

3. In elastic fluid utilizing apparatus, an annular row of blades mounted thereon and rotatable about a central axis, arcuate shroud segments secured to said blades, said shroud segments having adjacent end faces spaced apart and defining openings extending in substantially the same direction as said axis, damping means in each of said openings, said damping means being divided into two halves along a plane extending radially from said axis, each said half being provided with an inclined surface, said end faces being convergent in radially outward direction, said inclined surface of each damper half mating with one of said end faces, said damper halves being urged toward each other by the action of centrifugal force into mutual slidable engagement along the radial plane, thereby frictionally resisting the blade vibrations, wherein the angle between said inclined surfaces and a line normal to said radial plane conforms to the following equation:

$$\tan \alpha = \frac{V_{OD}}{\mu P}$$

wherein tan $\alpha$ = tangent of the angle between the inclined surface and a line normal to the radial plane
$P$ = centrifugal force in pounds on both damper halves
$\mu$ = coefficient of friction of contact surfaces
$V_{OD}$ = force in pounds required to completely restrain relative motion of the shroud ends.

References Cited in the file of this patent

UNITED STATES PATENTS

| | | |
|---|---|---|
| 1,554,614 | Allen | Sept. 22, 1925 |
| 2,197,334 | Bohan | Apr. 16, 1940 |
| 2,310,412 | Flanders | Feb. 9, 1943 |
| 2,326,145 | Kroon | Aug. 10, 1943 |
| 2,398,140 | Heppner | Apr. 9, 1946 |